Nov. 13, 1962   A. A. CADWALLADER   3,063,303
GUIDE CONDUIT FOR MOTION TRANSMITTING SYSTEM
Filed Nov. 5, 1958
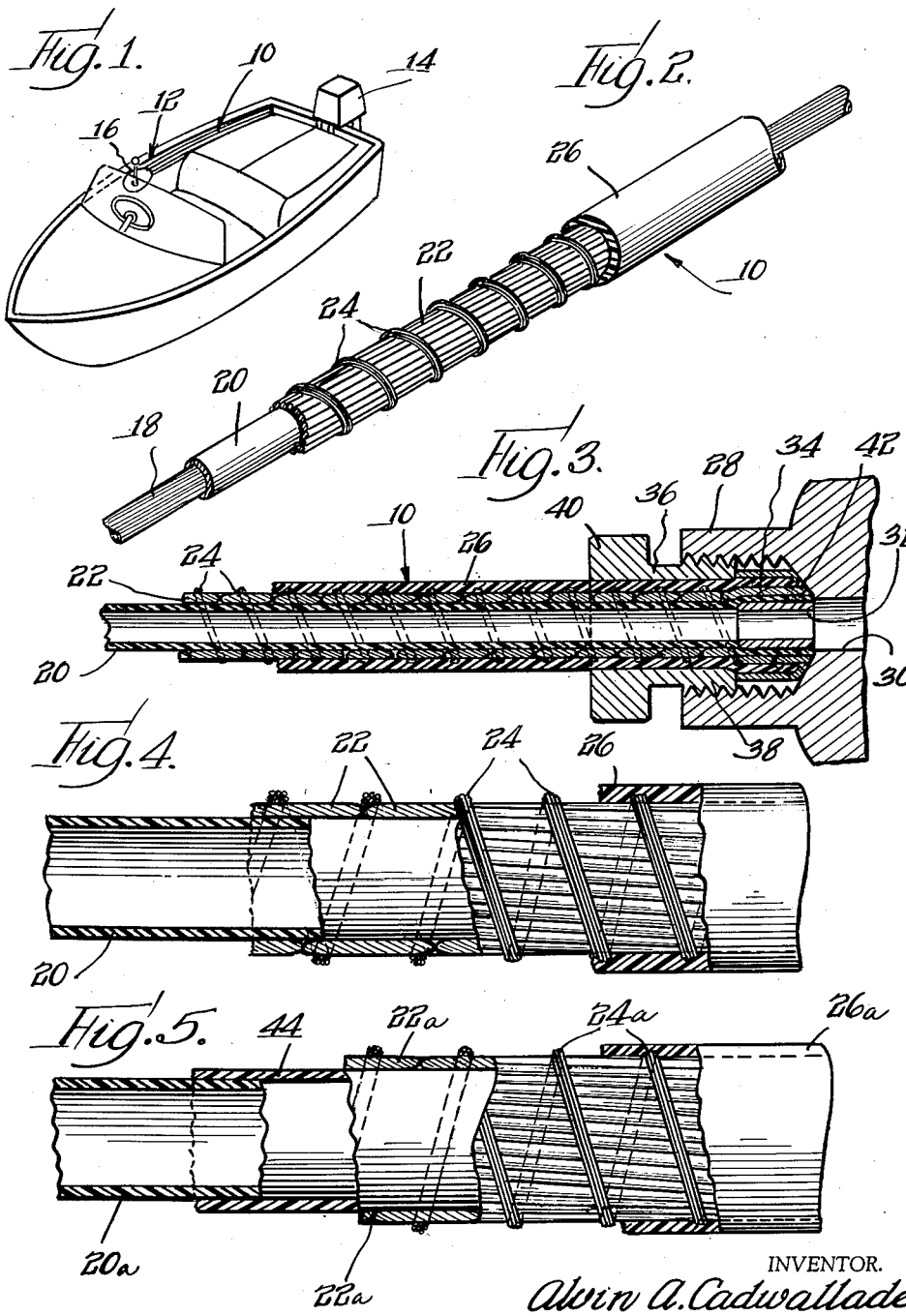
INVENTOR.
Alvin A. Cadwallader
BY
Olson & Trexler
attys.

United States Patent Office 3,063,303
Patented Nov. 13, 1962

3,063,303
GUIDE CONDUIT FOR MOTION
TRANSMITTING SYSTEM
Alvin A. Cadwallader, Hatboro, Pa., assignor to Teleflex Incorporated, North Wales, Pa., a corporation of Delaware
Filed Nov. 5, 1958, Ser. No. 771,984
2 Claims. (Cl. 74—501)

The present invention relates to a novel guide conduit, and more particularly to a novel guide conduit for a cable or other motion transmitting element of a mechanical control system or the like.

While various uses for a guide conduit of the type contemplated herein may suggest themselves, the conduit will be described in connection with its use in a marine engine control system in order to facilitate the present disclosure. It is an important object of the present invention to provide a novel guide conduit for a motion transmitting or control system which is constructed so as to minimize friction losses and thereby improve the efficiency of the control system.

Another important object of the present invention is to provide a novel highly efficient guide conduit of simple flexible construction which facilitates installation of the conduit in boats or other locations where it may be necessary to form one or more bends in the conduit.

Still another object of the present invention is to provide a novel guide conduit of the above described type which is easily bent or flexed and which at the same time is constructed for accommodating tension, compression and radial loads in a manner which minimizes losses in motion transmitting efficiency as a result of backlash.

A further object of the present invention is to provide a novel guide conduit of the above described type which is capable of protecting the motion transmitting element or cable against contact by moisture to which the control system might be subjected as a result of its use in a marine installation.

Still another object of the present invention is to provide a novel guide conduit of the above described type which may be easily connected with and sealed to end fittings without the aid of special tools whereby installation of a control system utilizing the guide conduit is facilitated.

Other objects and advantages of the present invention will become apparent from the following description and the accompanying drawings wherein:

FIG. 1 is a simplified perspective view showing a control system incorporating features of the present invention installed in an outboard motor boat;

FIG. 2 is a fragmentary perspective view showing a portion of a guide conduit incorporating features of the present invention and a motion transmitting element or cable extending therethrough;

FIG. 3 is a fragmentary longitudinal sectional view showing a guide conduit incorporating features of the present invention connected with an end fitting;

FIG. 4 is an enlarged fragmentary partial sectional view of a guide conduit incorporating features of the present invention; and FIG. 5 is a view similar to FIG. 4 but shows a slightly modified form of the present invention.

Referring now more specifically to the drawings wherein like parts are designated by the same numerals throughout the various figures, a guide conduit 10 incorporating features of the present invention is adapted to be used in various motion transmitting or control systems such as a throttle control system 12 for an outboard motor 14 as shown in simplified form in FIG. 1. As will be understood, such a control system includes a control lever mechanism 16 connected with the outboard motor throttle actuating mechanism by an elongated flexible element or cable 18 which is housed within the guide conduit 10. In such an installation it may be necessary to make one or more bends in the guide conduit, which bends tend to decrease the efficiency of the control system and increase the difficulty of installing the conduit.

The conduit 10 is provided with an inner liner or tube 20 formed from polytetrafluoroethylene commonly sold under the trademark Teflon. The Teflon liner provides the conduit with an interior antifriction surface engageable with the motion transmitting element or cable 20 so that friction losses in the control system are minimized. In order to provide the guide conduit with high tensile strength and resistance to elongation so as to help minimize backlash losses, a circumferentially continuous layer of wires 22 is provided around the liner 20. It is important to note that the wires 22 are tightly packed together in abutting relationship and are helically wound with a long lead around the tube or liner 20. A cord or roving 24 of nylon or glass fibre is tightly wrapped around the layer of wires 22. The roving 24 is wound so that it is provided with relatively widely spaced helical coils having a short lead. These coils serve to resist radial deformation or expansion of the conduit particularly under loads which may be imparted to bends in the conduit by the motion transmitting cable 18.

The conduit 10 is provided with an outer tube or sheath 26 which closely confines the roving 24 and also the individual wires 22 so as to maintain these elements substantially in fixed relationship with respect to each other while permitting flexing or bending of the conduit. Furthermore, the provision of the plastic sheath around the wires in combination with the plastic tube within the wires combines with the wires to enable the conduit to accommodate compression loads in a manner which aids in minimizing losses in operating efficiency as a result of backlash. The sheath 26 is formed from a material having "memory" characteristics or, in other words, a material which tends to return to the shape in which it was originally formed after it has been deflected or bent. The sheath 26 is initially extruded in a straight line so that it tends to remain in or return to a straight condition. This characteristic is especially useful since the conduit may frequently be stored or shipped in a coiled condition and the tendency of the sheath to return to a straight condition facilitates uncoiling of the conduit and installation in a boat or other control system. Nylon is a tough resilient material having a "memory" characteristic which is especially suitable for the sheath 26. Preferably the liner 20 is also initially extruded in a straight line so as to aid the sheath 26 in maintaining the conduit in a straight condition. This not only aids in the handling and insulation of the conduit as mentioned above but also tends to eliminate unnecessary curves and bends in the conduit so as to enhance the efficiency of the control system.

As will be understood, the conduit 10 may have opposite ends thereof secured by various end fitting means. One end fitting means with which the conduit may be connected without the aid of special tools is shown in FIG. 3. This end fitting means comprises an internally threaded nipple 28 extending from a member such as the housing for the control lever mechanism 16 having a passageway 30 therethrough for accommodating the motion transmitting element or cable 18. An apertured plug 32 is driven into an end of the conduit 10, which end is first confined by a collar 34 so that the conduit is squeezed and tightly gripped between the plug and the collar. A fitting 36 which is applied to the conduit prior to the application of the collar 34 has a threaded end portion 38 adapted to be turned into the nipple 28. The fitting 36 is provided with an outer end nut portion 40 so as to facilitate turning thereof. When the fitting 36 is tight, the inner end thereof engages the collar 34 which is fixed with respect to the conduit so that the end of the conduit is forced into sealing engagement with an internal conical seat 42 formed around the passageway 30. Thus the interior of the conduit 10 may be readily sealed so as to prevent moisture and the like from entering the conduit.

FIG. 5 shows a conduit incorporating a modified form of the present invention, which conduit is similar to the structure described above as indicated by the application of identical reference numerals with the suffix *a* added to corresponding elements. This embodiment differs in that an additional tube 44 of tough resilient plastic material such as nylon is provided. The tube 44 is located between the antifriction liner 20a and the layer of wires 22a for increasing the strength and compression accommodating characteristics of the conduit. In addition this tube is also initially extruded in a straight line so that it serves to aid in making the conduit self-supporting in a straight condition.

While the preferred embodiments of the present invention have been shown and described herein, it is obvious that many structural details may be changed without departing from the spirit and scope of the appended claims.

The invention is claimed as follows:

1. In a mechanical motion transmitting control system of the type described, a movable motion transmitting element, a guide conduit for accommodating the movable motion transmitting element, said guide conduit comprising an inner flexible resinous plastic tube providing an internal antifriction surface for engaging and guiding the motion transmitting element, a layer of generally longitudinally extending wires helically wound around said tube with a long lead for accommodating tension loads, a multiple thread cord helically wound tightly around said wires with spaced coils having a short lead, and a tough flexible plastic sheath exteruded closely around and retaining said cord and said wires.

2. In a mechanical motion transmitting control system of the type described, a movable motion transmitting element, a guide conduit for accommodating the movable motion transmitting element, said guide conduit comprising an inner resinous plastic flexible tube providing an internal antifriction surface for engaging and guiding the motion transmitting element, a substantially circumferentially continuous layer of generally longitudinally extending abutting wires helically wound around said tube with a long lead for accommodating tension loads, a multiple glass fiber thread roving helically wound tightly around said wires with spaced coils having a short lead, and a flexible sheath extruded in a straight line closely around and retaining said roving and said wires.

References Cited in the file of this patent

UNITED STATES PATENTS

| | | |
|---|---|---|
| 2,382,966 | Arens | Aug. 21, 1945 |
| 2,564,602 | Hurst | Aug. 14, 1951 |
| 2,573,361 | Rodgers et al. | Oct. 30, 1951 |
| 2,691,900 | Brickman | Oct. 19, 1954 |
| 2,742,931 | Ganahl | Aug. 24, 1956 |
| 2,787,917 | Schroeder | Apr. 9, 1957 |
| 2,821,092 | Cordora et al. | Jan. 28, 1958 |
| 2,850,915 | Bratz | Sept. 9, 1958 |
| 2,969,812 | Ganahl | Jan. 31, 1961 |
| 3,002,534 | Noland | Oct. 3, 1961 |
| 3,015,969 | Bratz | Jan. 9, 1962 |

FOREIGN PATENTS

| | | |
|---|---|---|
| 1,078,061 | France | May 5, 1954 |
| 781,473 | Great Britain | Aug. 21, 1957 |